United States Patent
Yamaguchi et al.

(10) Patent No.: US 6,431,761 B1
(45) Date of Patent: Aug. 13, 2002

(54) CAGE FOR ROLLING BEARING

(75) Inventors: Keijiro Yamaguchi; Koji Ueda; Manabu Ohori, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/620,415

(22) Filed: Jul. 20, 2000

(30) Foreign Application Priority Data

Jul. 21, 1999 (JP) .......... 11-206689
Sep. 13, 1999 (JP) .......... 11-259533

(51) Int. Cl.[7] .......... F16C 33/56
(52) U.S. Cl. .......... 384/527; 384/913
(58) Field of Search .......... 384/523, 527, 384/572, 573, 625, 913

(56) References Cited

U.S. PATENT DOCUMENTS

| | | | |
|---|---|---|---|
| 4,938,614 A | * 7/1990 | Imamura et al. | 384/537 |
| 5,187,017 A | 2/1993 | Hatano et al. | 428/469 |
| 5,518,605 A | * 5/1996 | Hadj-Rabah et al. | 205/148 |
| 5,528,706 A | * 6/1996 | Harimoto et al. | 384/573 |
| 5,833,373 A | 11/1998 | Ueno et al. | 384/527 |
| 5,862,592 A | * 1/1999 | Harimoto et al. | 384/573 X |
| 6,010,248 A | * 1/2000 | Ueno et al. | 384/527 |
| 6,093,263 A | * 7/2000 | Kobayashi et al. | 148/318 |

FOREIGN PATENT DOCUMENTS

| | | |
|---|---|---|
| DE | 691 13 689 T2 | 5/1996 |
| DE | 195 00 576 C2 | 7/1996 |
| DE | 694 01 551 T2 | 7/1997 |
| DE | 694 02 272 T2 | 10/1997 |
| DE | 198 04 172 a1 | 8/1998 |
| DE | 698 00 046 T2 | 12/1999 |
| JP | 10-147855 | 6/1998 |

* cited by examiner

Primary Examiner—Thomas R. Hannon
(74) Attorney, Agent, or Firm—Sughrue Mion, PLLC

(57) ABSTRACT

In a steel cage for rolling bearing which is nitrided to form a compound layer on the surface thereof, when the thickness of a dense layer in the compound layer 1 is predetermined to a range of from 3 $\mu$m to 20 $\mu$m, the abrasion can be inhibited, improving the abrasion resistance. Further, when a porous layer which acts as a lubricant reservoir is predetermined to a range of from 2 $\mu$m to 25 $\mu$m, the exhaustion of lubricant can be inhibited, improving the seizing resistance.

8 Claims, 6 Drawing Sheets

CAGE FOR ROLLING BEARING

BACKGROUND OF THE INVENTION

1. Field of the Invention

The present invention relates to a cage for rolling bearing for use in general industrial machine, automobile engine, machine tool, steel machine, etc. More particularly, the present invention relates to improvements in the function of a press cage made of steel.

2. Description of the Related Art

As a cage for rolling bearing, there has heretofore been occasionally used a press cage obtained by subjecting a cold-rolled steel plate SPCC or SPCE material to pure nitriding ($NH_3$ gas nitriding) or soft nitriding such as gas soft nitriding, toughtriding and ionic nitriding.

When a cage is subjected to nitriding, the matrix of the cage is hardened to obtain a surface hardness Hv of from 350 to 600 resulting in an excellent abrasion resistance. Further, since the nitride compound formed on the surface of the matrix has some resistance to high temperature softening, the adhesion or welding of the cage to the inner or outer race or the rolling elements can hardly occur, thereby providing good seizing resistance. Moreover, since the nitride compound is chemically very stable and inert, the cage exhibits an excellent corrosion resistance in a corrosive atmosphere. Further, nitriding is effected at a temperature as low as not higher than A1 transformation point (723° C.), i.e., 400° C. to 600° C., causes little heat treatment strain and thus exerts a sufficient effect on parts which can be easily deformed due to its small thickness such as cage.

In recent years, however, rolling bearings have been subject to severer working conditions. In particular, when the lubricant film runs out, even a nitrided cage can easily wear. As the bearing is operated, the resulting abrasion dust causes the generation of dents on the inner and outer race or rolling elements. Further, the production of abrasion dust and the exhaustion of lubricant are accelerated, thereby causing seizing on the cage.

As a means for solving the foregoing problem there is proposed in JP-A-10-147855 (The term "JP-A" as used herein means an "unexamined published Japanese patent application") a technique which comprises forming on the surface of a compound layer formed by nitriding on iron-based mechanism parts a porous layer having a thickness of from 1 to 20 $\mu$m which is from 10 to 50% of that of the compound layer wherein the porous layer is impregnated with a lubricant by vacuum impregnation or heat impregnation to improve the lubricating properties thereof.

In the foregoing conventional technique, however, the thickness of the compound layer is only relatively defined. Therefore, the upper and lower limits of the thickness of the compound layer are determined by the thickness of the porous layer. Accordingly, the thickness of the compound layer is occasionally very great. In this case, the surface hardness of the entire compound layer is reduced, making it difficult to secure desired abrasion resistance or deteriorating dimensional accuracy. Further, the foregoing conventional technique is disadvantageous in that the step of impregnating the porous layer with a lubricant by vacuum impregnation or heat impregnation after nitriding adds to the production cost.

SUMMARY OF THE INVENTION

It is an object of the present invention to provide a cage for rolling bearing having assured stable abrasion resistance at a reduced cost by predetermining the tolerance of the thickness of the porous layer and porous layer in a compound layer formed by nitriding.

The inventors made extensive studies. As a result, it was found that the abrasion resistance and seizing resistance of a cage for rolling bearing which has been subjected to nitriding such as pure nitriding and soft nitriding depend on the thickness of the dense layer and the porous layer in the compound layer, respectively. Thus, the present invention has been proposed.

In other words, a cage which solves the foregoing problems can be provided by subjecting a press cage made of cold-rolled steel plate to nitriding such as pure nitriding and soft nitriding so that a dense layer has a thickness of from 3 $\mu$m to 20 $\mu$m and a porous layer has a thickness of from 2 $\mu$m to 25 $\mu$m, respectively.

The term "compound layer" as used herein is meant to indicate a layer made of a nitrogen compound integrated with an iron-based substrate. The term "dense layer" as used herein is meant to indicate a layer disposed on the iron-based substrate in the nitrogen compound layer. The term "porous layer" as used herein is meant to indicate a layer having a porosity of from 10% to 60% disposed on the side of the dense layer opposite the iron-based substrate in the nitrogen compound layer.

DETAILED DESCRIPTION OF THE DRAWINGS

Embodiments of implication of the present invention will be described hereinafter.

Figure 1:
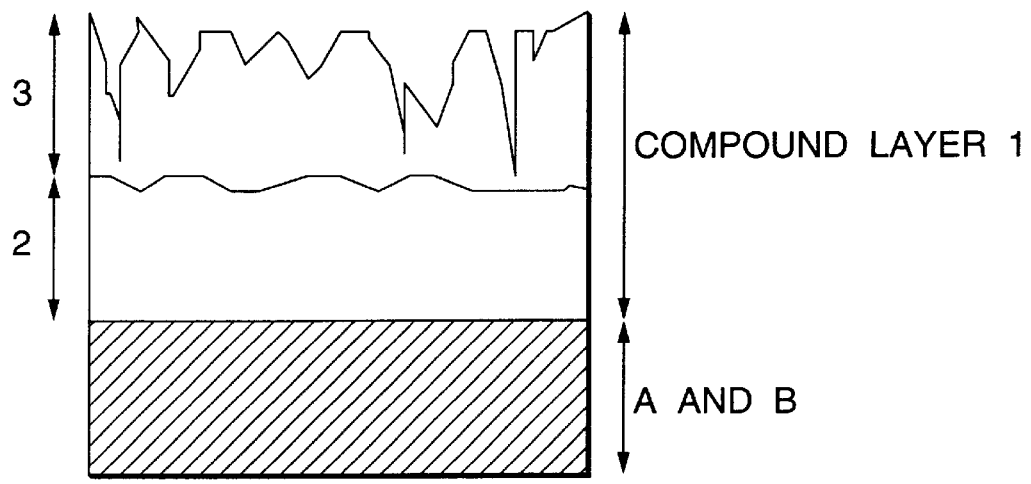
FIG. 1 is a schematic diagram illustrating the structure of a nitrided compound layer.

In the cage for rolling bearing made of steel of the present invention which has been nitrided to form a compound layer on the surface thereof, the surface compound layer 1 formed above the diffusion layer A and mother layer B shown in FIG. 1 is composed of ε-phase ($Fe_2N$, $Fe_3N$), ν'-phase ($Fe_4N$), iron carbonitride, and a small amount of iron oxide mainly composed of $Fe_3O_4$. The surface compound layer 1 has a double-layer structure having a dense layer 2 disposed on the mother layer B, which is an iron-based substrate, and a porous layer 3 having a porosity of from 10% to 60% disposed outside the dense layer 2.

The foregoing porous layer 3 exhibits a good initial drape, acts as a lubricant reservoir and exerts a good effect of protecting oil film to inhibit seizing.

However, when the thickness of the porous layer 3 exceeds a certain value, the surface of the cage is too roughened. Thus, even when coated with a lubricant, uniform lubricant layer cannot be formed, leaving the surface of the cage roughed. As a result, the initial abrasion increases. The resulting abrasion dust causes the generation of dents on the inner and outer race or rolling elements in a bearing or the occurrence of scratching or digging abrasion. These phenomena accelerate the exhaustion of lubricant, worsening the lubricating conditions and hence occasionally causing seizing. A further disadvantage is that the dimensional accuracy is deteriorated. By previously removing excess porous layer in the vicinity of the surface using a mechanical means, these problems can be eliminated. However, this approach adds to the cost.

On the contrary, when the thickness of the porous layer 3 is short, no effect of protecting lubricant film can be exerted, causing the cage to come in direct contact with the inner or outer race or the rolling elements and hence resulting in the generation of heat that accelerates abrasion or damaging seizing. As a result, the cage can be operated in only a reduced life.

Then, the applicants made the following experiment to make the proper thickness of the porous layer 3 obvious.

Figure 2:
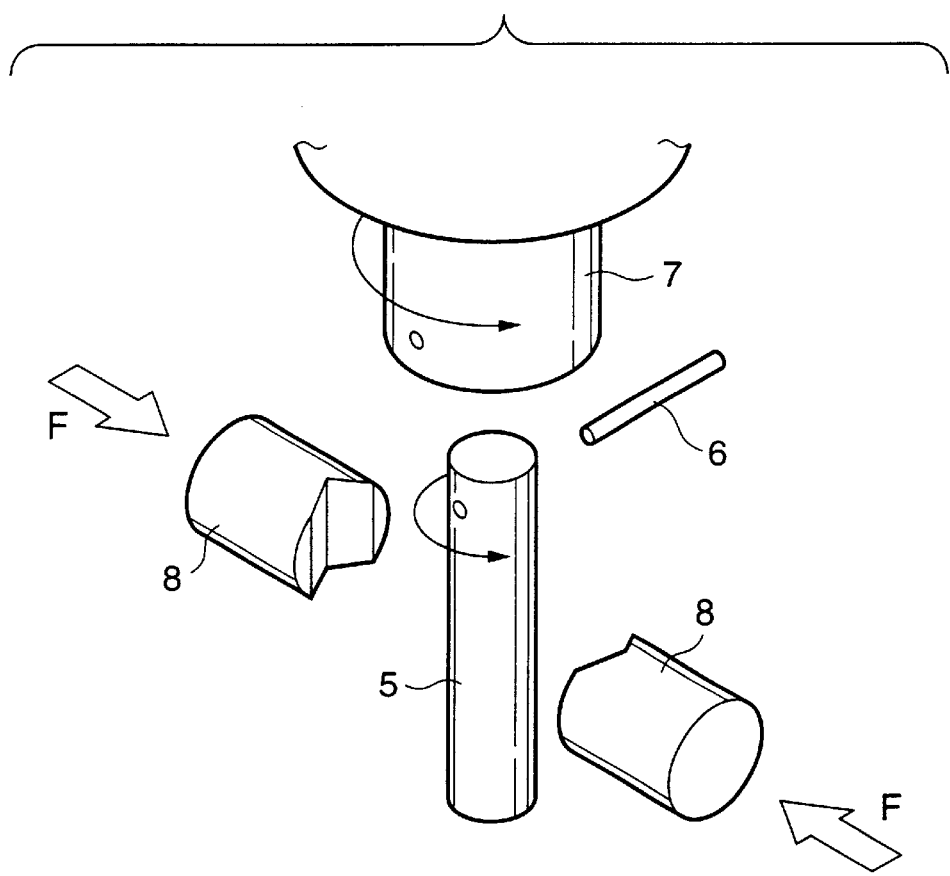
FIG. 2 is a perspective view illustrating the outline of a Faville-Le Vally type frictional wear testing machine.

In some detail, using a Faville-Le Vally type frictional wear testing machine as shown in FIG. 2, a test pin 5 which is a gas-nitrided test material mounted on a rotary device 7 with a shear pin 6 was rotated at a rotary speed of 300 rpm under a load F given by a pair of gas-nitrided V blocks 8, 8 disposed opposed to each other with the test pin 5 interposed therebetween. Under these conditions, various test materials 5 were examined and compared for abrasion resistance.

For gas nitriding, pure nitriding with a mixture of $N_2$ and $NH_3$ as an atmosphere was effected at a temperature of 560° C. The compound layer formed on the test pin 5 and V block 8 formed a dense layer having a constant thickness of 5 μm and a porous layer having five thicknesses (0 μm, 2 μm, 15 μm, 28 μm).

As a lubricant there was used a turbine oil. Friction was effected at a speed of 0.15 m/s.

Figure 3:
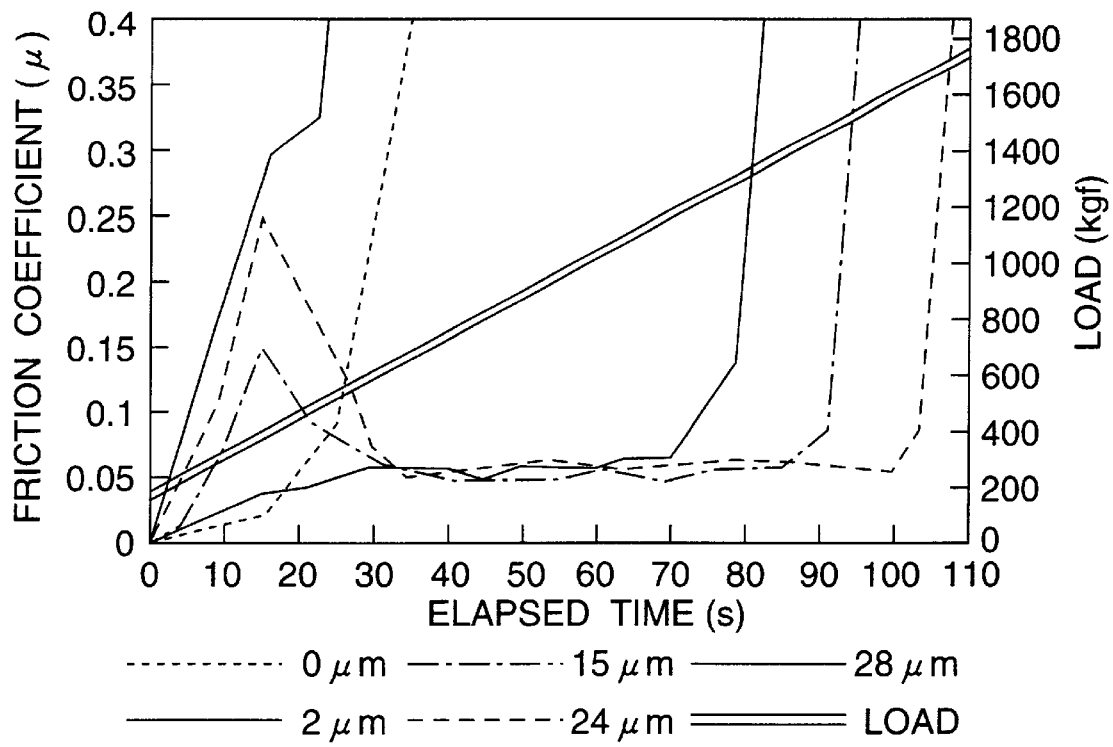
FIG. 3 graphically shows experimental results illustrating the relationship between the change of thickness of porous layer in the nitrided compound layer and the friction coefficient.

The results of the test are shown in FIG. 3.

When the thickness of the porous layer falls below about 2 μm, the porous layer cannot be expected to exert its effect of protecting lubricant film. As a result, the friction coefficient μ shows a rapid rise to cause seizing. On the contrary, when the thickness of the porous layer is 2 μm or more, the seizing resistance is drastically improved. Accordingly, the lower limit of the thickness of the porous layer is defined to be 2 μm.

As the thickness of the porous layer increases, the porous layer tends more to act as a lubricant reservoir and thus can hardly be seized and exhibits a good seizing resistance but shows more initial abrasion. Accordingly, as shown by the curves for porous layers having a thickness of 15 μm and 24 μm in FIG. 3, the generation of a small initial abrasion (rise in the friction coefficient μ shown in the vicinity of 15 seconds as elapsed time) is attributed to the initial drape effect of the porous layer with the shaft. However, when a great amount of initial abrasion occurs as in the case where the thickness of the porous layer exceeds 25 μm, the initial drape effect can no longer be exerted. The resulting abrasion dust worsens the lubricating conditions, causing seizing in a short period of time. Accordingly, the upper limit of the porous layer is 25 μm.

In other words, the seizing resistance of the compound layer depends on the thickness of the porous layer. When the thickness of the porous layer is from 2 μm to 25 μm, the resulting seizing resistance is improved to provide a cage for rolling bearing which can be used under severe working conditions.

The foregoing results can be applied not only to the case where the thickness of the dense layer is limited to a predetermined value of 5 μm but also to the case where the thickness of the dense layer is varied as described below.

The inventors further made the following experiment to make the proper thickness of the dense layer 3 clear.

Figure 4:
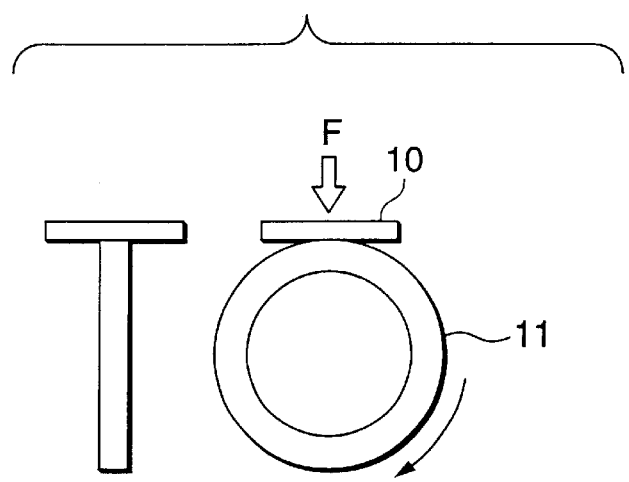
FIG. 4 is a diagram illustrating the outline of an Ogoshi type frictional wear testing machine.

In some detail, using an Ogoshi type frictional wear testing machine as shown in FIG. 4, a tabular SPCC fixed test piece 10 which had been subjected to gas nitriding was pressed against a circular SUJ2 rotary test piece 11 under a load F for rotary test. Under the conditions, various fixed test pieces 10 were examined and compared for abrasion resistance.

For the gas nitriding of the fixed test piece 10, pure nitriding with a mixture of 20% of $N_2$ and 80% of $NH_3$ as an atmosphere was effected at a temperature of 560° C. The resulting compound layer including a porous layer having a constant thickness of 5 μm and a dense layer having various thicknesses.

The rotary test piece 11 was obtained by hardening SUJ2 material at a temperature of 840° C., and then tempering the material at a temperature of 170° C.

Referring to the test conditions, the test was effected free from lubricant (dry condition) at a face pressure of from 0.2 to 4 kg/mm², a friction rate of 2.6 m/s and a friction distance (slipping distance) of 400 m.

Figure 5:
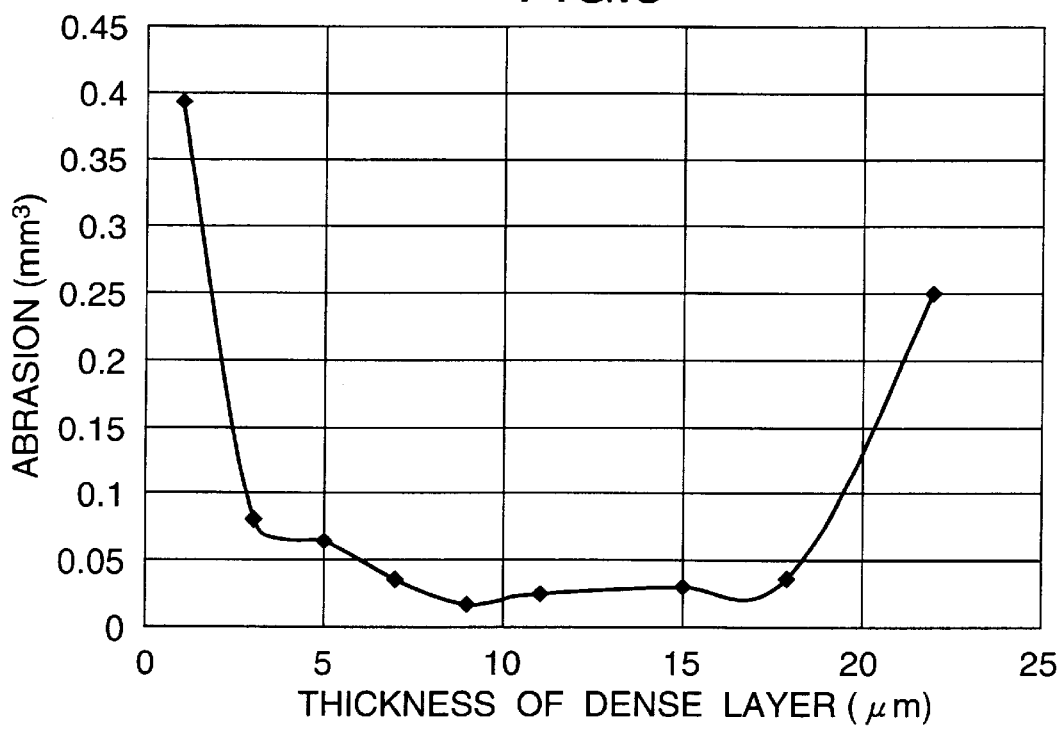
FIG. 5 graphically shows experimental results illustrating the relationship between the change of thickness of dense layer in the nitrided layer and the abrasion.

The results of test are shown in FIG. 5.

When the thickness of the dense layer falls below 3 μm, a drastically great amount of abrasion occurs. On the contrary, when the thickness of the dense layer is 3 μm or more, abrasion is inhibited. This is because when the dense layer has a thickness as small as less than 3 μm, it has an uneven thickness that causes uneven nitriding. Thus, when uneven nitriding produces some areas where no dense layer is formed, SPC substrate comes in direct contact and hence sliding contact with the bearing steel constituting the inner or outer race or the rolling elements, disabling the cage too early. Accordingly, a nitrided cage composed of a compound layer formed by a dense layer having a thickness of less than 3 μm cannot be expected to have satisfactory abrasion resistance.

On the contrary, also when the thickness of the dense layer exceeds 20 μm, an increase in the abrasion can be recognized. In some detail, the dense layer exhibits the highest surface hardness when its thickness is from 5 μm to 10 μm. When the thickness of the dense layer exceeds this range, the position at which it exhibits the highest hardness lies inside the layer, lowering the surface hardness. When the thickness of the dense layer exceeds 20 μm, the surface hardness of the dense layer is recognized to be remarkably lowered. In other words, it cannot be always said that the thicker the dense layer is, the better is the abrasion resistance. The drop of the hardness of the dense layer due to the increase of the thickness of the layer causes damage or breakage of the cage. Accordingly, it is considered necessary that the thickness of the nitrided cage be not more than 20 μm.

The foregoing results can be applied not only to the case where the thickness of the porous layer is limited to 5 μm but also to the case where the thickness of the porous layer is varied. In other words, the abrasion resistance of the compound layer depends on the thickness of the dense layer. When the thickness of the dense layer is from 3 μm to 20 μm, preferably from 5 μm to 10 μm, a nitrided cage having an excellent abrasion resistance can be provided.

As can be seen in the foregoing results, in accordance with the present invention, a steel cage for rolling bearing which has been nitrided to form a compound layer on the surface thereof can form a cage having good abrasion resistance and seizing resistance even if nitriding is soft nitriding when the thickness of the dense layer and porous layer are from 3 μm to 20 μm and from 2 μm to 25 μm, respectively.

EXAMPLE 1

An experiment made to confirm the effect of the first embodiment of the present invention will be described hereinafter.

As the cage to be tested there was used a press cage corresponding to self-aligning roller bearing 22212 made of cold-rolled steel plate SPCC which had been subjected to pure nitriding (gas nitriding) and soft nitriding (gas soft nitriding, toughtriding, ionic nitriding, NV ultranitriding) as shown in Table 1 to form a nitrided compound layer having a dense layer and a porous layer on the surface thereof. Cages A to I of the present invention and Comparative Cages A to H thus obtained were then subjected to the following various tests. The term "NV ultranitriding" as used herein is a term of nitriding developed by Airwater Inc.

<Abrasion Resistance>

In order to evaluate the cage for abrasion resistance, a radial life abrasion testing machine produced by NSK Co., Ltd. was used. The change in the weight of various cages after 3,000 hours of operation at a rotary speed of 3,000 rpm with a lubricant having a viscosity VG of 10 being supplied at a rate of 1 l/min under a radial load of 5,200 N was measured.

<Seizing Resistance>

In order to evaluate various cages for seizing resistance, a radial life seizing testing machine produced by NSK Co., Ltd. was used. The time required until the cage is seized when operated at a rotary speed of 3,000 rpm under a radial load of 5,200 N. Into the pocket of the various cages were each injected a lubricant having a viscosity VG of 5 in a total amount of 0.2 ml. The lubricant was then allowed to fit with the cage.

Figure 6:
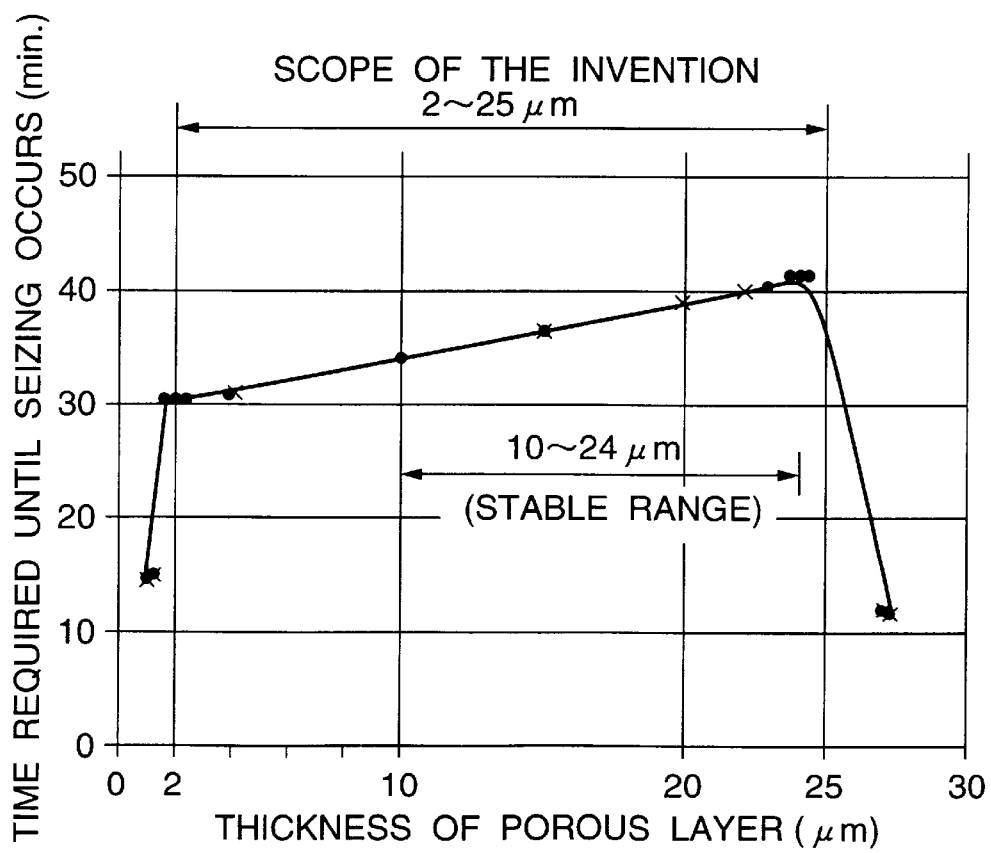
FIG. 6 is a graph illustrating the relationship between the change of thickness of porous layer and the time required until seizing occurs in connection with the test results in Table 1.

The results of abrasion of the various test cages and time required until the cages are seized are together set forth in Table 1. The relationship between the thickness of the porous layer and the time required until the cage is seized was then determined from these results and was graphically plotted in FIG. 6.

Comparative Example A relates to a purely nitrided cage having a dense layer having a thickness of less than 3 μm. Comparative Example A has a disadvantage that an uneven dense layer gives the highest abrasion among all the examples.

Comparative Example B relates to a purely nitrided cage having a dense layer having a thickness of greater than 20 μm. Comparative Example B has a disadvantage that the drop of hardness of dense layer gives a very large abrasion.

Comparative Example C relates to a purely nitrided cage having a porous layer having a thickness of less than 2 μm. Comparative Example C has a disadvantage that the porous layer cannot protect the lubricant film, causing the cage to be seized in a short period of time.

Comparative Example D relates to a purely nitrided cage having a porous layer having a thickness of greater than 25 μm. Comparative Example D has a disadvantage that the increase in the initial abrasion is accompanied by the worsening of the lubricating conditions that causes the cage to be seized in a short period of time.

In other words, a cage the thickness of either the dense layer or porous layer of which falls outside the scope of the present invention as purely nitrided cages of Comparative Examples A to D cannot be expected to have sufficient abrasion resistance and seizing resistance and thus cannot be used as a nitrided cage.

TABLE 1

| Samples | Type of nitriding | Thickness of dense layer (μm) | Thickness of porous layer (μm) | Abrasion (mg) | Time required until seizing occurs (min) |
| --- | --- | --- | --- | --- | --- |
| Example A | Gas nitriding | 3 | 2 | 3 | 30 |
| Example B | | 4 | 24 | 3 | 41 |
| Example C | | 10 | 10 | 2 | 34 |
| Example D | | 19 | 2 | 3 | 30 |
| Example E | | 20 | 24 | 3 | 41 |
| Example F | Gas soft nitriding | 16 | 23 | 2 | 40 |
| Example G | Toughtriding | 18 | 24 | 2 | 41 |
| Example H | Ionic nitriding | 8 | 4 | 3 | 31 |
| Example I | NV nitriding | 8 | 2 | 3 | 30 |
| Comparative Example A | Gas nitriding | 1 | 22 | 8 | 40 |
| Comparative Example B | | 22 | 15 | 7 | 36 |
| Comparative Example C | | 5 | 1 | 2 | 15 |
| Comparative Example D | | 10 | 27 | 2 | 12 |
| Comparative Example E | Gas soft nitriding | 2 | 20 | 8 | 39 |
| Comparative Example F | Toughtriding | 15 | 27 | 3 | 12 |
| Comparative Example G | Ionic nitriding | 10 | 1 | 2 | 15 |
| Comparative Example H | NV nitriding | 22 | 4 | 7 | 31 |

Comparative Examples E to H relate to cages which have been subjected to soft nitriding in various manners wherein the thickness of either the dense layer or porous layer falls outside the scope of the present invention. These comparative examples are disadvantageous in that when the thickness of the dense layer falls outside the range of from 3 μm to 20 μm, the cages are liable to abrasion, and when the thickness of the porous layer falls outside the range of from 2 μm to 25 μm, the cages are liable to deterioration of seizing resistance. None of these cages can be used as nitrided cage.

On the other hand, Examples A to I of the present invention relate to cages which have been subjected to pure nitriding or soft nitriding in various manners wherein the thickness of the dense layer and porous layer fall within the range of from 3 μm to 20 μm and from 2 μm to 25 μm, respectively. Thus, when the thickness of the dense layer and the porous layer fall within the scope of the present invention, a cage having good abrasion resistance and seizing resistance can be obtained regardless of the kind of nitriding. Therefore, the effect of the present invention is made obvious.

In some detail, in accordance with the present invention as mentioned above, when a press cage formed by a cold-rolled steel plate is nitrided such that the thickness of the dense layer and the porous layer fall within the range of from 3 μm to 20 μm and from 2 μm to 25 μm, respectively, it exhibits drastically improved abrasion resistance and seizing resistance as compared with the conventional nitrided cages. Thus, a cage for rolling bearing which can exhibit its properties sufficiently even under severe conditions which have recently been encountered with rolling bearings can be provided. Accordingly, a great practical effect can be exerted.

With the foregoing cage for rolling bearing having a nitride layer consisting of a dense layer having a thickness of from 3 μm to 20 μm and a porous layer having a thickness of from 2 μm to 25 μm exhibiting an excellent abrasion resistance as a base (first embodiment), a further improvement in the seizing resistance of the foregoing cage for rolling bearing will be described hereinafter (second embodiment).

As already described, the working conditions of rolling bearing have become severe more and more. In particular, under severe operating conditions as in high load low speed operation or rapid activation operation, even a nitrided cage is disadvantageous in that it undergoes seizing due to sliding contact of the guiding race with the bearing ring.

In order to cope with the foregoing problem, it has been heretofore practiced to subject the cage not only to nitriding or soft nitriding but also to oxonitriding, which is nitriding combined with oxidation. In this manner, the cage can be prevented from being seized due to sliding contact with the bearing ring. However, under some treatment conditions, the resulting abrasion resistance is inferior to that developed by nitriding or soft nitriding.

The inventors made extensive studies of solution to the foregoing problem. As a result, it was found that the abrasion resistance of cage for rolling bearing which has been subjected to oxonitriding depends on the average surface oxygen concentration. It was further found that when a press cage made of cold-rolled steel plate is subjected to oxonitriding such that the average surface oxygen concentration is controlled to a predetermined range, a cage having not only an improved seizing resistance but also a good abrasion resistance can be obtained.

The inventors herein propose a steel cage for rolling bearing which has been subjected to carbonitriding such that the average surface oxygen concentration is controlled to a range of from 1.0 to 25.0% by weight.

The contents of the proposal will be further described hereinafter.

As oxonitriding methods, there are known (1) a method of subjecting the material to pure nitriding or soft nitriding in a gas mainly composed of $NH_3$, and then subjecting the material to oxidation with oxygen, air, overheated water vapor or the like in the same or separate furnace (salt bath soft nitriding may be followed by salt bath oxidation), and (2) a method of treating in a mixed atmosphere containing $NH_3$ and several percent of an oxidizing gas such as oxygen, air and overheated water vapor.

In the former method (1), an oxide layer and a nitride layer are formed on the surface of the cage. On the other hand, in the latter method (2), an oxide layer, an oxonitride layer and a nitride layer are formed on the surface of the cage. In any case, formed in the compound layer is not only a nitride but also an oxonitride and/or oxide which exhibits nonmetallic properties, providing a drastic improvement in seizing resistance.

In order to study the effect of oxonitriding on seizing resistance, the inventors made a test on test pins which had been subjected to various nitriding processes such as pure nitriding, soft nitriding and oxonitriding to modify the surface thereof using a Faville-Le Vally type frictional wear testing machine as previously mentioned (FIG. 2) to evaluate abrasion resistance and seizing resistance.

Table 2 shows the results of test. As the lubricant there was used a turbine oil. The friction rate was 0.15 m/s.

TABLE 2

| Classification of nitriding | Type of nitriding | Shear load on pin (kgf) |
| --- | --- | --- |
| | None | 282 |
| Pure nitriding | $NH_3$ gas nitriding | 846 |
| Soft nitriding | Gas soft nitriding | 1,047 |
| | Salt bath soft nitriding | 901 |
| Oxonitriding | $NH_3$ gas nitriding (water content in $NH_3$: 3%) | 1,050 |
| | Gas soft nitriding + oxidation (atmosphere) | 1,310 |
| | Salt bath nitriding + salt bath oxidation | 1,120 |

As can be seen in the foregoing results, the cage which has been subjected to oxonitriding exhibits an improved seizing resistance as compared with those which have not been treated or have been nitrided. Under severe working conditions which have recently been encountered, this effect can be sufficiently exerted. However, in order to secure such an excellent seizing resistance, it is necessary that the oxide layer and oxonitride layer have a certain or greater thickness. On the contrary, when these layers have too great a thickness, there occur problems such as poor dimensional accuracy, peeling and abrasion. Accordingly, the thickness of the oxide layer or the oxide layer plus the oxonitride layer is preferably from 3.5 μm to 30 μm. The upper limit is preferably at least 25 μm.

The reason why the upper limit of the oxide layer or the oxide layer plus oxonitride layer (depth from the surface) is defined to 30 μm (at least 25 μm) is that the porous layer (maximum thickness: 25 μm) previously mentioned is entirely oxidized to give the best results. If the upper portion of the dense layer is slightly oxidized, better results can be provided. The reason why the lower limit of the oxide layer or the oxide layer plus oxonitride layer is defined to 3.5 μm is that the thickness of the oxide layer or the oxide layer plus oxonitride layer needs to be at least 3.5 μm to provide a sufficient effect of oxonitriding which can be definitely distinguished from soft nitriding. Although an ordinary nitriding can produce an oxide layer having a thickness of from about 1 to 2 μm in some treatment atmosphere, improvement in seizing resistance as expected in oxonitriding cannot be attained.

Iron oxides contained in the compound layer formed on the surface of steel cage by oxonitriding include FeO, $Fe_3O_4$, and $Fe_2O_3$. Since FeO and $Fe_3O_4$ inhibit the adhesion of the cage to the rolling elements to reduce friction, the cage which has been subjected to oxonitriding exhibits better abrasion resistance than those which have been subjected to nitriding. However, as the average surface oxygen concentration increases, the content of $Fe_2O_3$ increases. $Fe_2O_3$ is hard and abrasive and thus exhibits high frictional characteristics. Accordingly, the oxonitrided cage having a great content of $Fe_2O_3$ exhibits a great friction coefficient on the area in contact with the rolling elements to have an increased abrasion and thus can hardly be kept reliable in abrasion resistance over an extended period of time.

The inventors made a two-cylinder type Amsler abrasion test on salt bath-oxonitrided SPCC having varied average surface oxygen concentrations to study the effect of surface oxygen concentration developed by oxonitriding on abrasion resistance.

Figure 7:
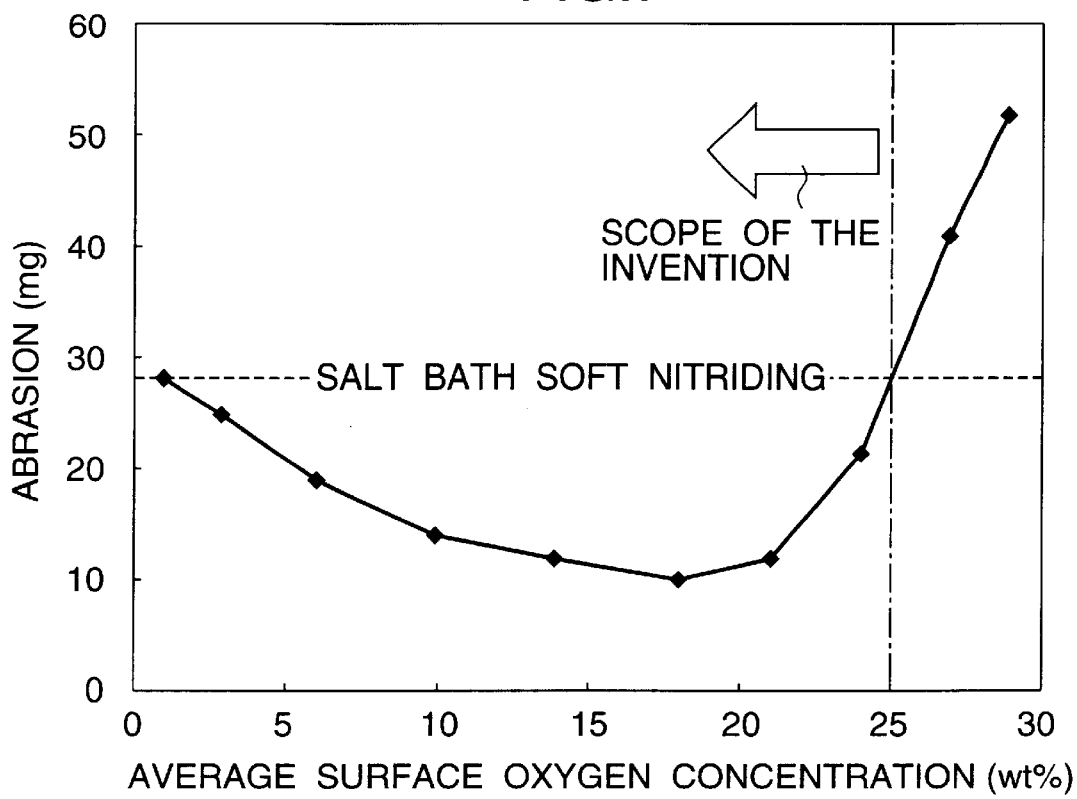
FIG. 7 is a graph illustrating the relationship between the change of average surface oxygen concentration and the abrasion obtained by subjecting oxonitrided cages to Amsler abrasion test.

The results of test are graphically plotted in FIG. 7.

Referring to the test conditions, the abrasion test was effected at a rotary speed of 1,000 rpm and a percent slippage of 10% under a load of 20 kg. As the lubricant there was used SAE30 motor oil.

In the graph, the broken line indicates the abrasion of SPCC which has been not subjected to oxidation but subjected to salt bath nitriding. As the average surface oxygen concentration developed by salt bath oxonitriding increases, the content of iron oxide in SPCC increases, inhibiting the adhesion and hence minimizing the abrasion. However, when the average surface oxygen concentration exceeds 25% by weight, the content of $Fe_2O_3$ in the compound layer increases, causing a rapid increase in the abrasion and hence worsening the abrasion resistance more than in the case where only nitriding is effected. Thus, the desired effect of oxonitriding cannot be expected. On the contrary, when the average surface oxygen concentration falls below 1% by weight, the abrasion increases more than in the case where only nitriding is effected. Similarly, the desired effect of oxonitriding cannot be expected.

Judging from the foregoing results, the average surface oxygen concentration developed by oxonitriding is from 1.0 to 25.0% by weight, preferably from 5 to 20% by weight in the present invention.

EXAMPLE 2

An experiment made to confirm the effect of the second embodiment will be described hereinafter.

Press cages corresponding to self-aligning roller bearing 22212 were prepared from cold-rolled steel plate SPCC. These press cages were then subjected to oxonitriding in various manners such that various average surface oxygen concentrations were attained to give test cages which were then subjected to the following tests. In the examples of the invention and comparative examples, oxonitriding was carried out by any of $NH_3$ gas nitriding (water content in $NH_3$: 3%), gas soft nitriding plus atmospheric oxidation and salt bath soft nitriding plus salt bath oxidation. A cage which had been subjected to salt bath soft nitriding alone was added to those of comparative examples.

<Abrasion Resistance>

In order to evaluate the cage for abrasion resistance, a radial life abrasion testing machine produced by NSK Co., Ltd. was used. The change in the weight of various cages after 3,000 hours of operation at a rotary speed of 3,000 rpm with a lubricant having a viscosity VG of 10 being supplied at a rate of 1 l/min under a radial load of 5,200 N was measured.

<Seizing Resistance>

In order to evaluate various cages for seizing resistance, a radial life seizing testing machine produced by NSK Co., Ltd. was used. The time required until the cage is seized when operated at a rotary speed of 3,000 rpm under a radial load of 5,200 N. Into the pocket of the various cages were each injected a lubricant having a viscosity VG of 5 in a total amount of 0.2 ml. The lubricant was then allowed to fit with the cage.

The results of average surface oxygen concentration and abrasion of the various test cages and time required until the cages are seized are together set forth in Table 3. For the measurement of average circularity surface oxygen concentration, the cage to be tested was scanned on the outermost surface by EPA. The measurements were then averaged.

TABLE 3

| Samples | Type of nitriding | Surface oxygen concentration (wt - %) | Abrasion (mg) | Time required until seizing occurs (min) |
| --- | --- | --- | --- | --- |
| Example A' | $NH_3$ gas nitriding | 5 | 2 | 70 |
| Example B' | (water content: 3%) | 15 | 1 | 71 |
| Example C' |  | 24 | 2 | 70 |
| Example D' | Gas soft nitriding + | 3 | 2 | 72 |
| Example E' | atmospheric oxidation | 18 | 1 | 72 |
| Example F' |  | 23 | 2 | 70 |
| Example G' | Salt bath soft nitriding + | 5 | 2 | 69 |
| Example H' | salt bath oxidation | 16 | 1 | 72 |
| Example I' |  | 23 | 2 | 70 |
| Comparative Example A' | $NH_3$ gas nitriding (water content: 3%) | 26 | 9 | 71 |
| Comparative Example B' | Gas soft nitriding + oxidation | 28 | 10 | 69 |
| Comparative Example C' | Salt bath soft nitriding + salt bath oxidation | 27 | 10 | 70 |
| Comparative Example D' | Salt bath soft nitriding | 0.3 | 3 | 40 |

Comparative Examples A' to C' relate to cages which have been subjected to oxonitriding in various manners. All these comparative examples exhibit an average surface oxygen concentration of greater than 25% by weight that causes the formation of iron oxide having non-metallic properties which give good seizing resistance. However, these cages have an increased content of $Fe_2O_3$, which causes great abrasion, and thus exhibit great abrasion and cannot be used as oxonitrided cage.

Comparative Example D' relates to a cage which has been subjected to salt bath soft nitriding alone. The cage exhibits an average surface oxygen concentration as low as 0.3% by weight and thus shows little abrasion but undergoes seizing in a short period of time.

On the other hand, Examples A' to I' of the present invention relate to cages which have been subjected to oxonitriding to exhibit an average surface oxygen concentration of less than 25% by weight. Oxonitriding causes the formation of iron oxide that gives far better seizing resistance than by soft nitriding in Comparative Example D'. Further, when the average surface oxygen concentration is predetermined to be not more than 25% by weight, the content of $Fe_2O_3$ can be minimized, causing no abrasion problems and hence making it possible to provide an oxonitrided cage excellent both in abrasion resistance and seizing resistance.

As mentioned above, in accordance with the second invention, when a press cage made of cold-rolled steel plate is subjected to oxonitriding, the resulting seizing resistance is drastically improved as compared with nitrided cages. Further, when the average surface oxygen concentration is controlled to 25% by weight, the conventional defective abrasion resistance of oxonitrided cages can be eliminated, making it possible to provide an oxonitrided cage which can sufficiently exhibit its good abrasion resistance and seizing resistance under severe conditions for rolling bearing which have been recently encountered.

The third embodiment will be described hereinafter.

The third embodiment relates to a cage for rolling bearing excellent in dragging resistance in addition to abrasion resistance and seizing resistance obtained by forming a sulfurized layer on the nitride layer (porous layer+dense layer).

As previously described with reference to the first and second embodiments, a cage for rolling bearing which can be operated under severe working conditions can be provided by subjecting a press cage made of cold-rolled SPCC material or SPCE material or stainless steel plate to nitriding such as pure nitriding, soft nitriding and oxonitriding so that the abrasion resistance, seizing resistance and fatigue resistance can be improved.

However, while a rolling bearing having such a cage incorporated therein is being operated for a long period of time, the nitrided cage releases a hard nitride abrasion dust which acts as a foreign matter to cause dragging (damage on a sliding surface or the like developed by aggregation of partial fine seizing) on the bearing elements or rolling elements. As a result, the rolling elements show an unstable behavior to collide with the cage, reducing the mechanical life of the cage or causing noise such as cage noise and squeak.

As a means for eliminating these problems there is proposed in JP-A-11-182556 a cage which has been subjected to gas sulfonitriding to form a sulfonitrided layer that improves the seizing resistance thereof. However, since the thickness of the sulfonitrided layer is as too great as from 100 μm to 400 μm, the sulfurized layer and the compound layer are insufficiently adhered to each other and thus can be easily peeled off or separated from each other, causing the sulfonitrided layer to lose its seizing resistance or dragging resistance. As a result, the sulfonitrided cage undergoes damage due to sudden movement of the rolling elements and thus cannot be used over an extended period of time.

The third embodiment has been worked out in the light of these problems. The third embodiment provides a cage for rolling bearing which is excellent in dragging resistance in addition to abrasion resistance, seizing resistance and fatigue resistance, which is characteristic to nitrided cages, and thus can be operated over an extended period of time without causing dragging on the surface of the bearing elements or rolling elements and hence without reducing the mechanical life or producing cage noise or squeak.

The inventors made studies. As a result, it was found that the dragging resistance of a cage depends on the thickness of sulfurized layer or interlayer in the sulfonitrided layer. In other words, it was found that when a steel press cage is subjected to sulfonitriding so that the thickness of the resulting sulfonitrided layer or sulfurized layer plus interlayer is from 0.1 μm to 10 μm, sufficient dragging resistance can be secured.

The third embodiment will be further described hereinafter.

Examples of the sulfonitriding method to be used in the present invention include the following three methods:

(1) Salt bath sulfonitriding method using a nitriding salt bath having a sulfur salt incorporated in an alkaline cyanate (through sulfonitriding) (2) Gas sulfonitriding method using a mixture of carburizing gas, nitriding gas and sulfurizing gas such as mixture of $CO_2$, $(NH_3+N_2)$ and $H_2S$ (3) Ionic sulfonitriding method of generating DC glow discharge in a mixed gas containing $N_2$ gas and $H_2$ gas at few torr, optionally containing $CH_4$ gas and Ar gas with $H_2S$ incorporated therein, to produce an ionized gaseous material which is then caught by the surface of the product to be treated in an electric field All these methods involve the simultaneous effectuation of nitriding and sulfurization and thus can be operated at a reduced cost.

Figure 8:
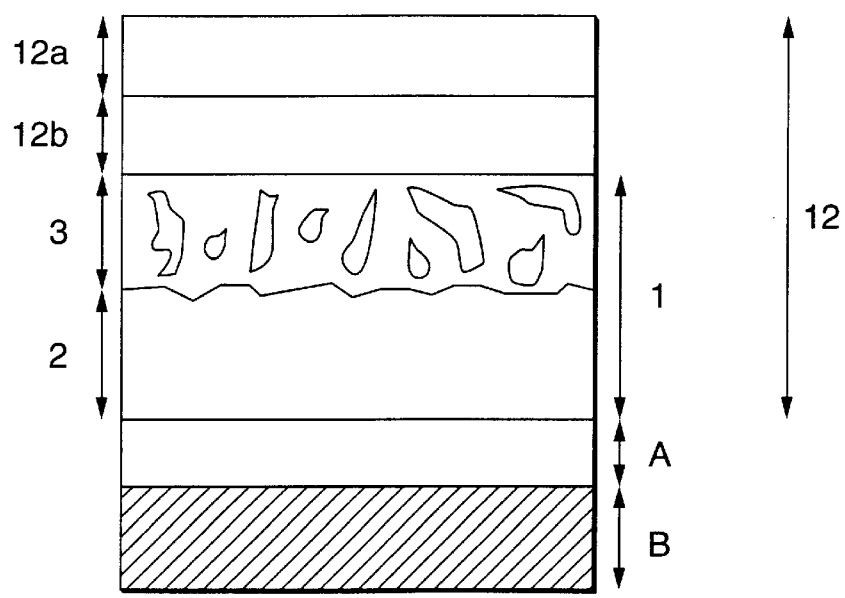
FIG. 8 is a schematic diagram illustrating the structure of a sulfonitrided layer.

When a steel press cage is subjected to sulfonitriding according to any of these methods, a sulfonitrided layer 12 as shown in FIG. 8 is formed on the surface of the cage at one step. The sulfonitrided layer 12 has different structures with different sulfonitriding methods. When the salt bath sulfonitriding method (1) or the gas sulfonitriding method (2) is used, a sulfurized layer 12a and a compound layer (including a porous layer 3 and a dense layer 2) are formed. When the ionic sulfonitriding method (3) is used, a sulfurized layer 12a, an interlayer 12b and a compound layer 1 are formed. The sulfurized layer 12a is composed of a black structure. The interlayer is composed of black gray structure. The compound layer is composed of white structure. The sulfurized layer 12a and the interlayer 12b are mainly composed of sulfuride (e.g., FeS, $Fe_{1-x}S$). The compound layer 1 is mainly composed of nitride (e.g., $\epsilon-Fe_{2-3}N$, $\gamma'-Fe_4N$) and carbide ($Fe_3C$).

Since the sulfurized layer 12a and the interlayer 12b in the sulfonitrided layer 12 are self-lubricating, the friction coefficient is reduced to lower the abrasion loss, improving the abrasion resistance. Further, since soft contact is given even under working conditions giving mechanical destructive abrasion to inhibit the rise in temperature due to frictional heat that causes adhesion, good seizing resistance during mallubrication is provided. Moreover, since the sulfurized layer 12a and the interlayer 12b have good dragging resistance, there occurs no dragging on the rolling elements and bearing rings, prolonging the mechanical life of the cage during prolonged use and preventing the occurrence of cage noise or squeak.

In some detail, in accordance with the sulfonitriding method of the third embodiment, the compound layer 1 (porous layer 3 and dense layer 2), which acts as a substrate, is kept excellent in abrasion resistance, seizing resistance and fatigue resistance. The lubricating sulfurized layer 12a and interlayer 12b formed on the compound layer 1 is excellent also in dragging resistance. In this arrangement, a cage for rolling bearing can be provided which can be operated over an extended period of time without causing dragging on the surface of bearing elements or rolling elements and hence without reducing the mechanical life or producing cage noise or squeak.

In a sulfonitrided cage, the seizing resistance and abrasion resistance depend on the thickness of the dense layer 2 and the porous layer 3 in the compound layer 1 as in the case of nitrided cage. In a sulfonitrided cage, too, when the thickness of the dense layer 2 and the porous layer 3 in the compound layer 1 are from 3 $\mu$m to 20 $\mu$m and from 2 $\mu$m to 25 $\mu$m, respectively, excellent abrasion resistance and seizing resistance can be provided.

In particular, nitriding of a press cage made of a stainless steel such as SUS304 tends to give uneven nitriding due to unevenness in the thickness of oxide film ($Cr_2O_3$) on the surface thereof. On the other hand, gas sulfonitriding and ionic sulfonitriding involve the use of a gas atmosphere containing $H_2S$ incorporated therein. Thus, the surface activation by $H_2S$ causes a stainless steel cage to be uniformly nitrided, giving better abrasion resistance, seizing resistance, fatigue resistance and dragging resistance than the conventional nitrided cages.

EXAMPLE 3

A dragging resistance test made to confirm the effect of the third embodiment will be described hereinafter.

In the present test, an angular type bearing corresponding to Call No. 7,013 having a sample cage mounted therein was operated for a predetermined period of time. The noise level of the entire bearing was then measured in accordance with the method described in JIS B1548 to evaluate the dragging resistance of the test cage.

Figure 9:
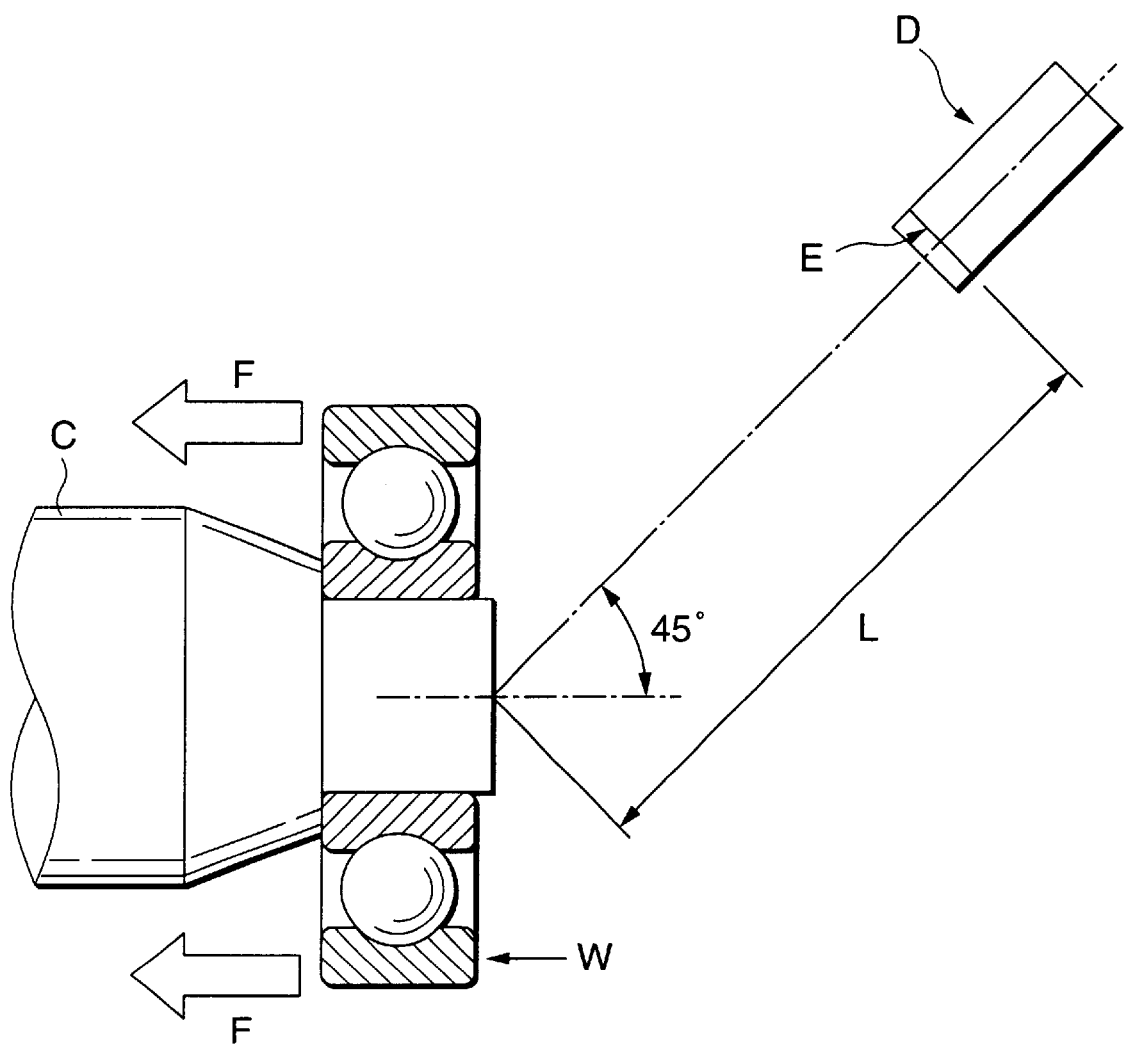
FIG. 9 is a diagram illustrating a method for measuring the noise level of a rolling bearing.
Figure 10:
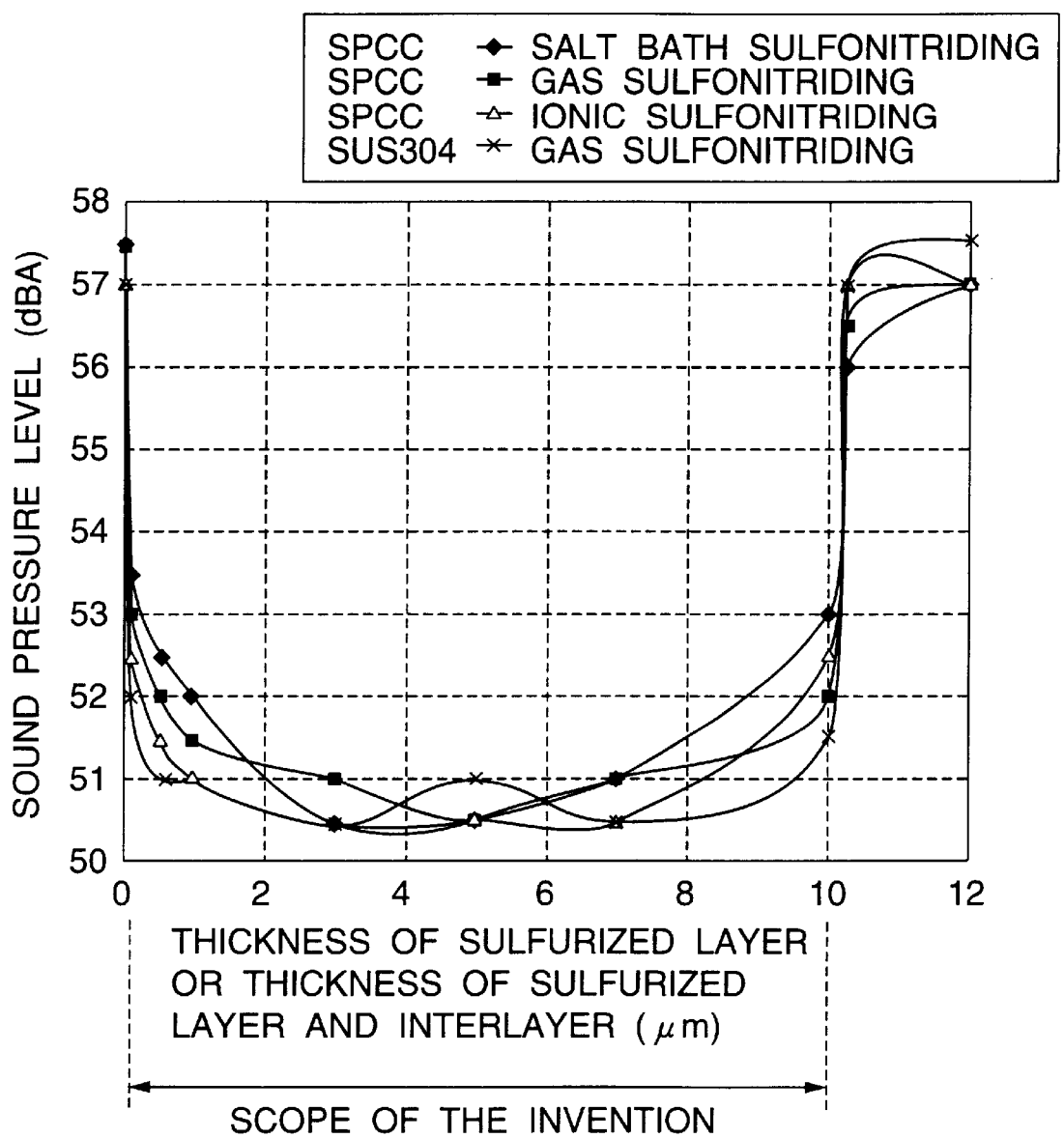
FIG. 10 is a graph illustrating the results of dragging resistance test by the measurement of the noise level of a rolling bearing.

As the sample cages there were used those obtained by subjecting press cage made of SPCC and SUS304 to sulfonitriding in various manners such that the thickness of sulfurized layer or sulfurized layer plus interlayer is varied. The outline of the measuring method is shown in FIG. 9. A microphone D was disposed in front of a test bearing W mounted on the rotary axis C in such an arrangement that the central axis of the microphone D crosses the frontal center of the test bearing W at an angle of 45° upward from the rotary axis D. The distance L between the frontal center and the oscillating plate E of the microphone E was predetermined to 100 mm. The test bearing W was then operated at a rotary speed of 1,800 rpm under an axial load F of 40 N for 200 hours. The noise level of the entire test bearing was then measured by a precision noise meter. The test results are set forth in FIG. 10.

When the thickness of the sulfurized layer or (sulfurized layer plus interlayer) falls below 0.1 $\mu$m, the resulting sound pressure is raised. This is because a hard nitride abrasion dust is produced due to sliding abrasion of the rolling elements with the cage during prolonged operation. As the nitride abrasion dust thus produced shows repeated movement with the cage and the rolling elements, there occurs fine damage or seizing, i.e., dragging on the rolling elements and bearing rings. Thus, the rolling elements make irregular movement and hence repeated collision with the cage. As a result, the life of the cage is reduced, or a noise such as cage noise and squeak is produced.

When the sulfonitride layer has a sulfurized layer or (sulfurized layer plus interlayer) having a thickness of 0.1 $\mu$m or more, the resulting dragging resistance can be drastically improved, eliminating the occurrence of dragging on the rolling elements or bearing rings. Accordingly, the sulfonitrided cage can be fairly used with a lowered sound pressure even during prolonged use.

On the contrary, when the thickness of the sulfurized layer or (sulfurized layer plus interlayer) exceeds 10 $\mu$m, the interlayer and the compound layer are insufficiently adhered to each other and thus can be easily peeled off or separated from each other, leaving the compound alone behind on the surface of the cage. In this case, dragging resistance which is originally characteristic to the sulfonitrided cage is lost. The resulting rapid movement of the rolling elements causes a drastic rise in the sound pressure, making it impossible for the sulfonitrided cage to be operated over an extended period of time.

The foregoing results were obtained not only from SPCC cages but also from stainless steel cages.

As can be seen in the foregoing results, in accordance with the third embodiment, a cage made of cold-rolled steel plate or stainless steel is subjected to sulfonitriding such that the thickness of sulfonitrided layer or (sulfurized layer plus interlayer) is from 0.1 $\mu$m to 10 $\mu$m. The resulting cage is excellent in dragging resistance in addition to abrasion resistance, seizing resistance and fatigue resistance characteristic to nitrided cages and thus can be operated over an extended period of time without causing dragging on the surface of the bearing elements or rolling elements and hence without reducing the mechanical life of the cage or producing cage noise or squeak.

As mentioned above, in accordance with the present invention, the thickness of the dense layer and porous layer constituting the compound layer formed by nitriding on a cold-rolled press cage are controlled to a range of from 3 $\mu$m to 20 $\mu$m and from 2 $\mu$m to 25 $\mu$m, respectively. In this arrangement, the abrasion resistance and seizing resistance can be drastically improved as compared with the conventional nitrided cages. As a result, a cage for rolling bearing which can sufficiently exhibit its properties even under severe working conditions for rolling bearing can be provided.

What is claimed is:

1. A steel cage for rolling bearing having a compound layer formed by nitriding on a surface thereof, said compound layer comprising a dense layer having a thickness of from 3 $\mu$m to 20 $\mu$m and a porous layer having a thickness of from 2 $\mu$m to 25 $\mu$m, said porous layer being formed on said dense layer.

2. The steel cage according to claim 1, wherein the thickness of said dense layer is in the range of 5 $\mu$m to 10 $\mu$m.

3. The steel cage according to claim 1, wherein said compound layer has an oxide/nitride layer on the surface thereof, said oxide/nitride layer comprising an oxide layer and a nitride layer and having a thickness of 3.5 $\mu$m to 30 $\mu$m.

4. The steel cage according to claim 1, wherein an average surface oxygen concentration of said compound layer is in the range of 1.0 to 25.0% by weight.

5. The steel cage according to claim 1, wherein said compound layer has a sulfurized layer having a thickness in the range of 0.1 $\mu$m to 10 $\mu$m.

6. The steel cage according to claim 1, wherein said porous layer has a porosity in the range of 10% to 60%.

7. The steel cage according to claim 1, wherein the thickness of said porous layer is in the range of 10 μm to 24 μm.

8. The steel cage according to claim 1, wherein said compound layer comprises ε-phase ($Fe_2N$, $Fe_3N$), ν'-phase ($Fe_4N$), iron carbonitride, and a small amount of iron oxide mainly composed of $Fe_3O_4$.

* * * * *